United States Patent
Sugisawa

(10) Patent No.: US 6,529,807 B2
(45) Date of Patent: Mar. 4, 2003

(54) APPARATUS AND METHOD FOR ALARMING DECREASE IN TIRE AIR-PRESSURE

(75) Inventor: Toshifumi Sugisawa, Kobe (JP)

(73) Assignees: Sumitomo Rubber Industries, Ltd., Hyogo-ken (JP); Sumitomo Electric Industries, Ltd., Osaka-fu (JP)

(*) Notice: Subject to any disclaimer, the term of this patent is extended or adjusted under 35 U.S.C. 154(b) by 23 days.

(21) Appl. No.: 09/790,583

(22) Filed: Feb. 23, 2001

(65) Prior Publication Data

US 2001/0020203 A1 Sep. 6, 2001

(30) Foreign Application Priority Data

Feb. 23, 2000 (JP) ........................................ 2000-046146

(51) Int. Cl.[7] .............................................. B60C 23/00
(52) U.S. Cl. .......................... 701/29; 340/442; 73/146.2
(58) Field of Search ............................. 701/29; 340/442, 340/443, 444; 73/146.2

(56) References Cited

U.S. PATENT DOCUMENTS

| | | | | |
|---|---|---|---|---|
| 5,343,741 A | * | 9/1994 | Nishihara et al. | 340/444 |
| 5,513,523 A | * | 5/1996 | Sekiya et al. | 340/444 |
| 5,614,882 A | * | 3/1997 | Latarnik et al. | 116/34 R |
| 5,828,975 A | * | 10/1998 | Isshiki et al. | 340/444 |
| 5,959,202 A | * | 9/1999 | Nakajima | 340/444 |
| 6,002,327 A | * | 12/1999 | Boesch et al. | 340/438 |

* cited by examiner

Primary Examiner—Michael J. Zanelli
Assistant Examiner—Eric M Gibson
(74) Attorney, Agent, or Firm—Birch, Stewart, Kolasch & Birch, LLP

(57) ABSTRACT

An apparatus for alarming a decrease in internal pressure of tires attached to a four-wheeled vehicle using judgement values obtained based on rotational information obtained from the tires. The apparatus comprises rotational information detecting means for detecting rotational information on each of the tires; memory means for storing the rotational information; arithmetic processing means for processing a judgement value from the rotational information; and judgement value correcting means for correcting the judgement value using a weight determined based on a rudder angle obtained by a rudder angle sensor attached to a steering wheel. The frequency of the occurrence of erroneous alarms during cornering can be reduced. As a result, it is possible to improve accuracy for detecting the pressure reduction of tires.

2 Claims, 2 Drawing Sheets

APPARATUS AND METHOD FOR ALARMING DECREASE IN TIRE AIR-PRESSURE

BACKGROUND OF THE INVENTION

The present invention relates to an apparatus and method for alarming decrease in tire air-pressure. More particularly, the present invention relates to an apparatus and method for alarming decrease in tire air-pressure capable of accurately correcting cornering and improving an accuracy for detecting reduction of tire pressure.

A conventional device (DWS system) for detecting decrease in tire air-pressure judges tire pressure reduction based on information from four ABS wheel speed sensors. The change of wheel speed is influenced by cornering as well as pressure reduction of the tires. According to the conventional DWS, all factors including the radius of cornering are calculated based on the information from the ABS sensors so as to decrease the influence of cornering and then a cornering correction is made. Even with this cornering correction, since the influences of the movement of load and slip generated during cornering are slightly change, the cornering correction cannot be completely made. According to the conventional DWS, however, the judgement values (DEL values) of the pressure reduction of tires calculated for about one minute are averaged and pressure reduction is judged based on the calculated average value. On an ordinary road, right and left curves exist almost in the same degree. For that reason, if a vehicle is running for about one minute, the influence of cornering is cancelled. Even if an error occurs to the cornering correction, therefore, there is few erroneous alarm caused by the influence of the cornering in the conventional DWS.

Nevertheless, if a vehicle runs on a circular track such as a test course, the vehicle runs only on a left curved passage or a right curved passage. Due to this, even if judgement values for one minute are averaged, the influence of cornering is not cancelled and erroneous alarm is sometimes given. This is because there is a rotational difference between inner wheels and outer wheels irrespective of normal internal pressure and this rotational difference cannot be distinguished from the rotational difference caused by pressure reduction.

In view of the above circumstances, the present invention has been made, and an object to provide an apparatus and method for alarming decrease in tire air-pressure capable of accurately making a cornering correction and improving an accuracy for detecting reduction of a tire pressure.

SUMMARY OF THE INVENTION

In accordance with the present invention, there is provided an apparatus for alarming decrease in tire air-pressure for alarming a decrease in internal pressure of tires attached to a four-wheeled vehicle using judgement values obtained based on rotational information obtained from the tires, comprising rotational information detecting means for detecting rotational information on each of the tires; memory means for storing the rotational information on each of the tires; arithmetic processing means for processing a judgement value from the rotational information on each of the tires; and judgement value correcting means for correcting the judgement value using a weight determined based on a rudder angle obtained by a rudder angle sensor attached to a steering wheel.

In accordance with the present invention, there is also provided a method for alarming decrease in tire air-pressure for alarming a decrease in internal pressure of tires attached to a four-wheeled vehicle using judgement values obtained based on rotational information obtained from the tires, comprising the steps of detecting the rotational information on each of the tires; storing the rotational information on each of the tires; processing a judgement value from the rotational information on each of the tires; and correcting the judgement value using a weight determined based on a rudder angle obtained from a rudder angle sensor attached to a steering wheel.

DETAILED DESCRIPTION

Hereinafter an apparatus and method for alarming decrease in tire air-pressure according to the present invention will be described with reference to the accompanying drawings.

Figure 1:
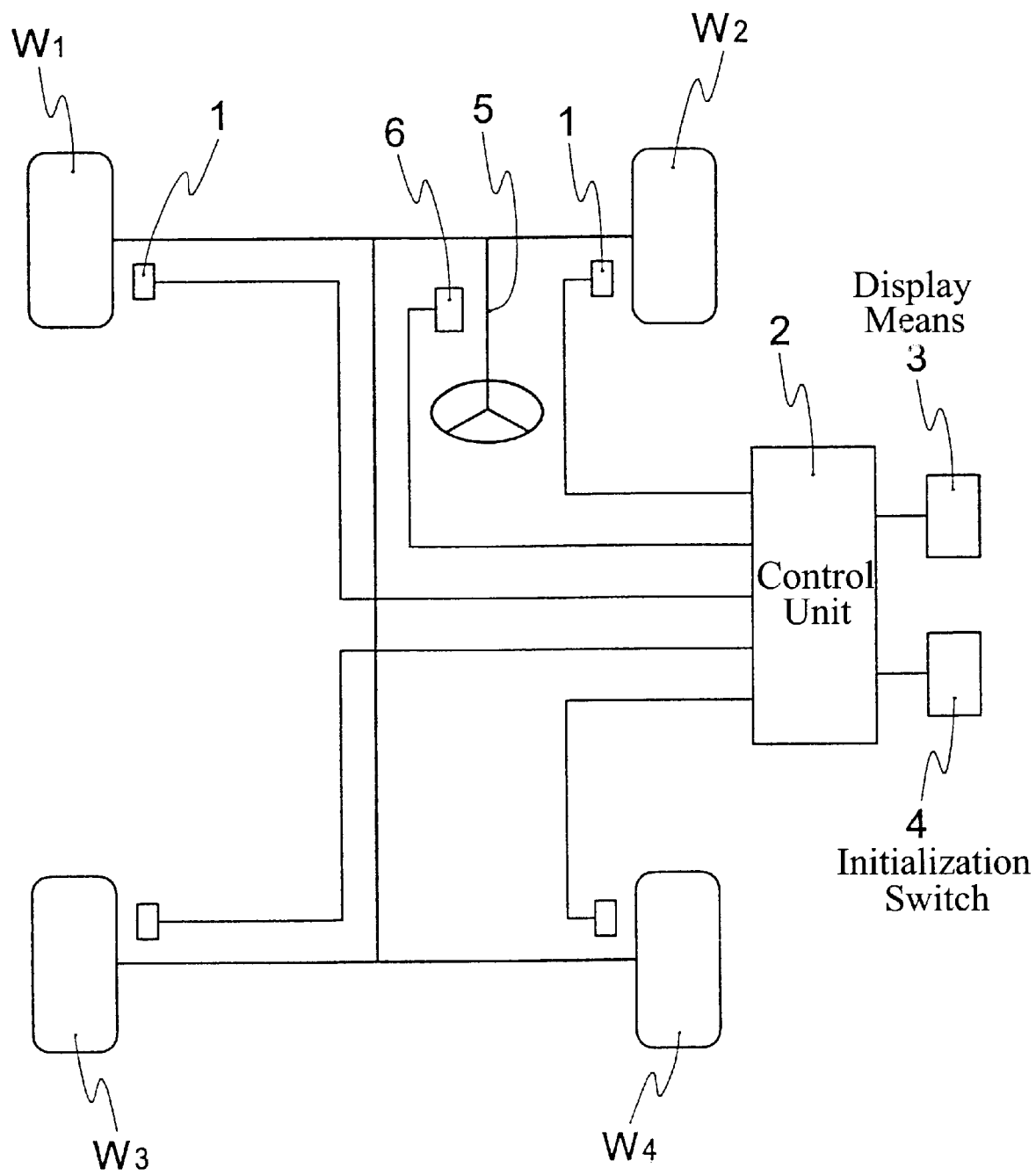
FIG. 1 is a block diagram showing one embodiment of an apparatus for alarming decrease in tire air-pressure according to the present invention.
Figure 2:
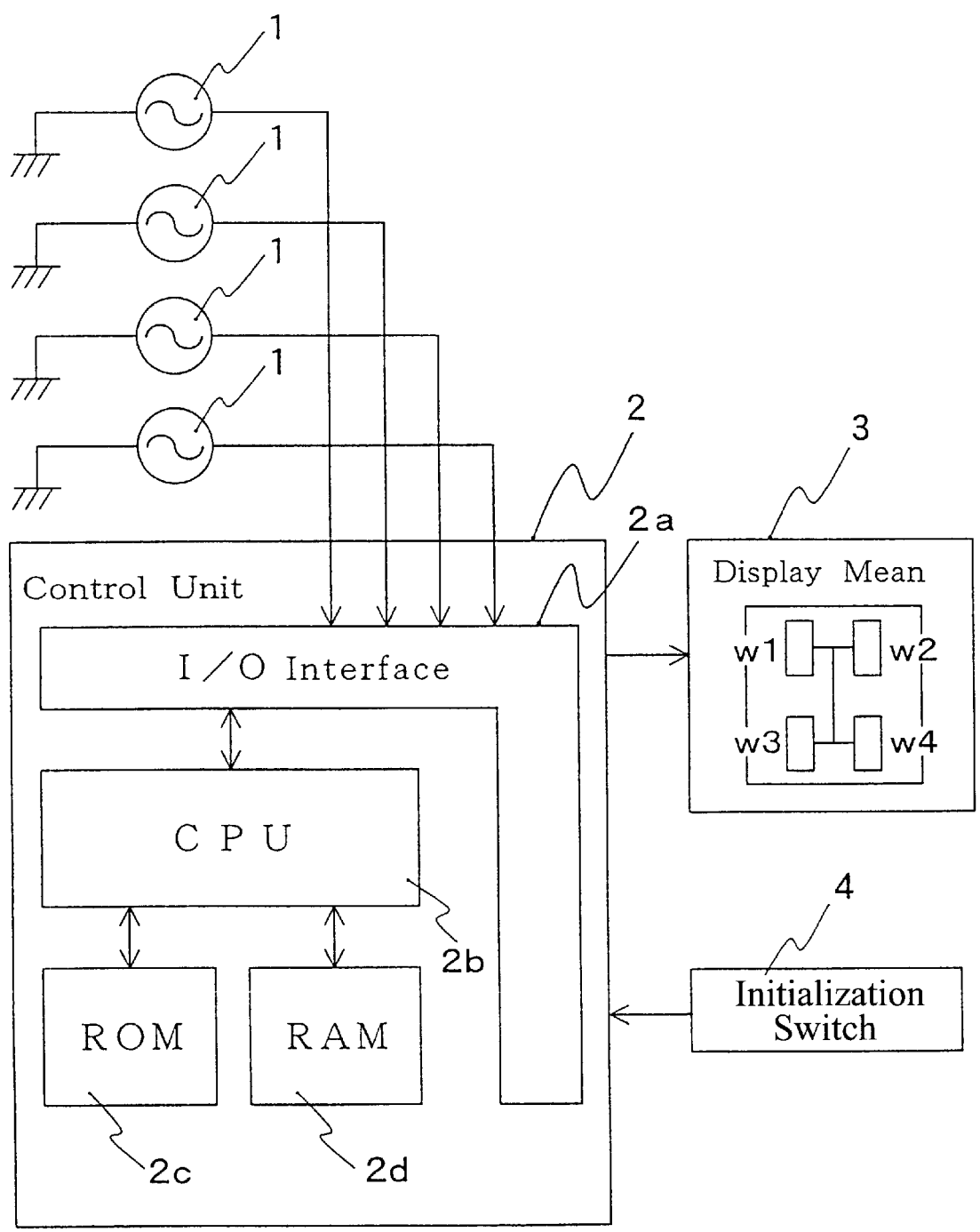
FIG. 2 is a block diagram showing the electrical arrangement of the apparatus for alarming decrease in tire air-pressure shown in FIG. 1.

As shown in FIG. 1, an apparatus for alarming decrease in tire air-pressure according to one embodiment of the present invention is designed to detect whether or not the air pressures of, for example, four tires $W_1$, $W_2$, $W_3$ and $W_4$ installed to a four-wheeled vehicle are reduced, and has ordinary wheel speed sensors 1 provided in connection with the respective tires $W_1$, $W_2$, $W_3$ and $W_4$. The outputs of the wheel sensors 1 are applied to a control unit 2. To the control unit 2, there are connected a display mean 3 which is constituted by a liquid crystal display device, a plasma display device or CRT for notifying the tire Wi whose air pressure has decreased, and a initialization switch 4 which can be operated by a driver. In addition, a rudder angle sensor 6 is attached to a steering wheel 5 and the control unit 2 gives weight corresponding to a rudder angle value inputted from the rudder angle sensor 6.

The control unit 2 consists of an I/O interface 2a necessary to transmit and receive a signal to and from an external device, a CPU 2b functioning as an arithmetic processing center, an ROM 2c storing the control operation program of the CPU 2b, and an RAM 2d into which data is temporarily written or from which data is read when the CPU 2b conducts a control operation. Arithmetic processing means and judgement value correcting means in this embodiment are included in the control unit 2.

From each wheel speed sensor 1, a pulse signal (referred to as "wheel speed pulse" hereinafter) corresponding to the number of revolutions of the tire $W_i$ is outputted. The CPU 2b calculates the rotational angular velocity $F_i$ of the tire $W_i$ on a predetermined sampling period $\Delta$(sec), e.g., per $\Delta T=1$ second, based on the wheel speed pulse outputted from the wheel speed sensor 1.

Here, since tires $W_1$ are manufactured while irregularity is present within a specification (initial difference), the effective rolling radii of the tires $W_i$ (values each obtained by dividing a distance advancing by one rotation by $2\pi$) are not necessarily equal even if all of the tires $W_i$ have ordinary internal pressure. As a result, the rotational angular velocities $F_1$ of the tires $W_i$ become irregular. Considering this, a corrected rotational angular velocity $F1_i$ to cancel the irregularity due to the initial difference is calculated. To be specific, the respective rotational angular velocity is corrected as follows:

$F1_1 = F_1$ $F1_2 = mF_2$ $F1_3 = F_3$ $F1_4 = nF_4$

Correction coefficients m and n are obtained as $m=F_1/F_2$ and $n=F_3/F_4$ by calculating the rotational angular velocity $F_i$ under conditions, for example, that a vehicle is running on a straight road and then obtaining the coefficients m and n based on the calculated rotational angular velocity $F_i$.

Then, based on the corrected rotational angular velocity $F1_i$, a vehicle speed V (Vi/4) and lateral acceleration (lateral G) and the like are calculated.

Further, a pressure reduction judgement value (DEL) for detecting decrease in air-pressure of the tire $W_i$ is to compare the difference between, for example, two sums of pairs of front-wheel tires and rear-wheel tires on a diagonal. Specifically, the sum of signals from one pair of wheels on a diagonal is subtracted from the sum of signals from the other pair of wheels on the diagonal, and a ratio of the subtraction result to the average value of the two sums is obtained from the following formula (1):

$$DEL = \frac{2 \times \{(V1+V4)-(V2+V3)\}}{V1+V2+V3+V4} \times 100\% \quad (1)$$

Conventionally, using this DEL value, the average value DEL5 of last n DEL values(DEL(n)), e.g., last five DEL values, and the average value DELAV of last n DEL5 values (DEL5(n)), e.g., last twelve DEL5 values, are calculated from the following formulas (2) and (3), respectively, and a pressure reduction judgement is then made using the resultant DELAV:

$$DEL5=(DEL(4)+DEL(3)+DEL(2)+DEL(1)+DEL(0))/5 \quad (2)$$

$$DELAV=(DEL5(11)+DEL5(10)+DEL5(9)+ \ldots +DEL5(0))/12 \quad (3)$$

According to the present invention, by contrast, the rudder angle sensor is attached to the steering wheel and a DEL value is weighted with the rudder angle, thereby correcting the DEL value. For example, a weight W to the rudder angle θ is represented as follows:

(1) where $-30° \leq \theta \leq 30°$, weight W=4;

(2) where $-90° \leq \theta < -30°$ or $30° < \theta \leq 90°$, weight W=2; and (3) where $\theta \leq -90°$ or $90° < 0$, weight W=1.

Based on the above, the weighted DEL value in the formula (1) and the weighted DEL5 in the formula (2) are represented by the following formulas (4) and (5):

$$DEL_W = DEL \times W \quad (4)$$

$$DEL_W5=(DEL_W(4)+DEL_W(3)+DEL_W(2)+DEL_W(1)+DEL_W(0))/\Sigma W \quad (5)$$

In the formula (5), ΣW is the integrated value of last five weights W.

Therefore, according to the present invention, by making a pressure reduction judgement using the weighted average value DELAV represented by the following formula (6), it is possible to decrease the influence of cornering and to prevent erroneous alarm. It is noted that the cases where the weight becomes W=4 decreases if a vehicle is running on a mountain path having continuous right and left curves. However, pressure reduction can be judged in the same degree as that of the conventional judgement.

$$DEL_WAV=\{DEL_W5(11) \times W(11)+DEL_W5(10) \times W(10)+DEL_W5(9) \times W(9)+DEL_W5(0) \times W(0)\}/\{W(11)+W(10)+W(9)+ \ldots +W(0)\} \quad (6)$$

In the formula (6), W(n) is the integrated value of last n weights W.

Next, the present invention will be described based on one example. The present invention should not be, however, limited to the following example.

EXAMPLE

A rudder angle sensor was attached to the steering wheel of a vehicle for which the air-pressure of tires were normally set, sensor information was captured by a personal computer and a software inputted into the conventional DWS was changed as shown in the above formulas (4) to (6).

Next, the vehicle circulated on a test course on which not only corners but also straight passages exist (maximum rudder angle θ=−60°).

As a result, while an erroneous alarm was given conventionally even with the tires having normal air pressure, no erroneous alarm was given in this example.

Next, for all the tires, the air pressure of one tire was reduced by 30% and those of the other tires were set at normal internal pressure and the vehicle ran in the same cornering. As a result, it was confirmed that an alarm for a pressure reduction was normally given.

As stated so far, according to the present invention, emphasis is put on a DEL value on a straight region and a judgement value is calculated using a weight determined based on a rudder angle. Thus, the frequency of the occurrence of erroneous alarms during cornering can be reduced. As a result, it is possible to improve accuracy for detecting the pressure reduction of tires.

What is claimed is:

1. An apparatus for indicating a decrease in internal pressure of tires attached to a four-wheeled vehicle using judgment values obtained based on tire rotational information of said vehicle, comprising rotational information detecting means for detecting rotational information based on rotation of each of the tires;

memory means for storing the rotational information on each of the tires;

arithmetic processing means for processing a judgment value based on the rotational information based on each of the tires; and judgment value correcting means for dividing rudder values obtained by a rudder angle sensor attached on a steering wheel into predetermined ranges, assigning a weight to each of the predetermined ranges, and correcting the judgement value using a weight corresponding to cornering during driving of said vehicle.

2. A method for indicating a decrease in internal pressure of tires attached to a four-wheeled vehicle using judgment values obtained based on tire rotational information, comprising the steps of:

obtaining rotational information on each of the tires;

storing the rotational information on each of the tires;

processing a judgment value based on the rotational information on each of the tires;

dividing rudder values obtained by a rudder value sensor attached to a steering wheel into predetermined ranges and setting a weight to each of the predetermined ranges; and correcting the judgment value using a weight corresponding to cornering during driving of said vehicle.

* * * * *